May 19, 1970 W. MAYEDA 3,513,387
GOLF PRACTICE DEVICE WITH CLUB SPEED INDICATOR
Filed Oct. 27, 1967 2 Sheets-Sheet 1

INVENTOR.
WATARU MAYEDA
BY
Bacon & Thomas
ATTORNEYS

May 19, 1970 W. MAYEDA 3,513,387
GOLF PRACTICE DEVICE WITH CLUB SPEED INDICATOR
Filed Oct. 27, 1967 2 Sheets-Sheet 2
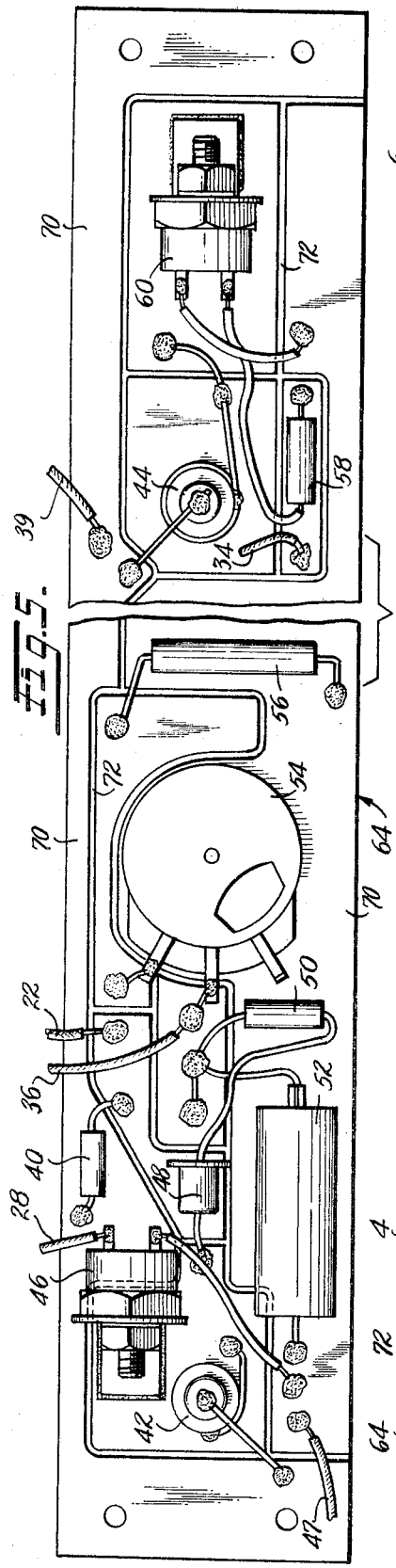
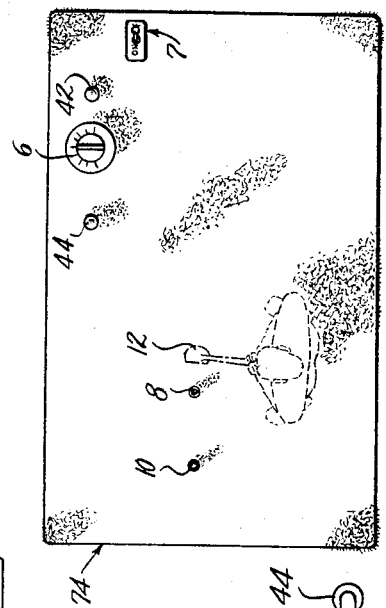
Fig. 8.
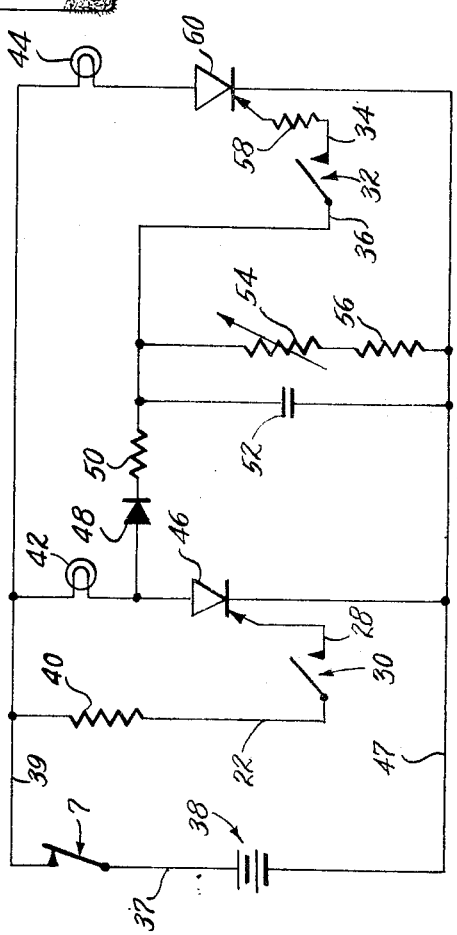
Fig. 7.
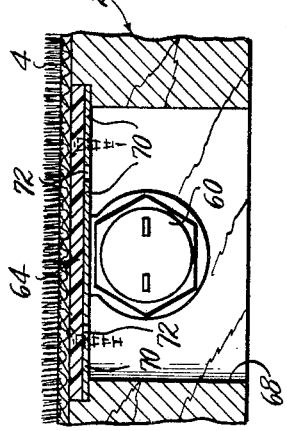
Fig. 6.
INVENTOR.
WATARU MAYEDA
BY
ATTORNEYS United States Patent Office 3,513,387
Patented May 19, 1970

3,513,387
**GOLF PRACTICE DEVICE WITH CLUB
SPEED INDICATOR**
Wataru Mayeda, 1106 S. Western,
Champaign, Ill. 61820
Filed Oct. 27, 1967, Ser. No. 678,626
Int. Cl. G01p 3/66
U.S. Cl. 324—70                                   8 Claims

ABSTRACT OF THE DISCLOSURE

A pair of spaced flexible pegs arranged to be successively struck by a golf club head during a practice swing and each arranged to momentarily close a switch when struck. A capacitor in an RC network is charged from a voltage source. An SCR is triggered by the first switch, to light an indicator lamp and remove the source voltage from the capacitor, which then starts to discharge at a preset rate. When the second switch is closed, the voltage remaining on the capacitor is applied to the control terminal of a second SCR and if that remaining voltage is high enough to second SCR conducts to light a second indicator lamp. If the remaining voltage is not high enough to trigger the second SCR, the second lamp will not light, indicating that the speed of the club head was less than a predetermined optimum value.

BACKGROUND OF THE INVENTION

This invention relates to a golf practice device and particularly to a device for determining and indicating the speed of travel of a golf club head during a practice swing relative to an optimum speed.

Many golf practice devices are known, which provide for a multiplicity of elements to be engaged and struck by a golf club head during a practice swing for indicating direction, force of impact and such factors, but applicant is unaware that any device has been known heretofore for determining whether or not a club head is travelling at at least an optimum velocity.

SUMMARY OF THE INVENTION

The invention comprises the concept of providing a pair of spaced actuator devices arranged to be successively actuated by a golf club head during a practice swing and wherein the time interval between actuations produces an indication to tell the golfer whether or not his club head was travelling at at least an optimum predetermined speed at the time of impact. When the first actuation occurs, the first actuator functions to start operation of a timing device which continues to operate until the second actuation occurs, a short interval of time later. The timing device produces a value corresponding to that time interval and which is compared, upon occurrence of the second actuation, with a predetermined known value corresponding to the optimum time interval or speed measure. Suitable indicating means are then actuated to indicate whether or not the desired speed was achieved. In a preferred embodiment, the actuator elements close normally-open switches to control electronic circuits, including an RC timing circuit. The value of the charge remaining on the circuit at the time of the second impact is then compared to a standard voltage and the comparison used to control operation of the indicating means.

BRIEF DESCRIPTION OF THE DRAWINGS

FIG. 5 is an enlarged bottom plan view of a circuit board, shown only diagrammatically in FIG. 3;
FIG. 6 is an enlarged vertical sectional view taken on the line 6—6 of FIG. 1;
FIG. 7 is a schematic view of the electrical circuits of the device;
and
FIG. 8 is a diagrammatic plan view of a modified form of the invention.

DESCRIPTION OF A PREFERRED EMBODIMENT

Figure 1:
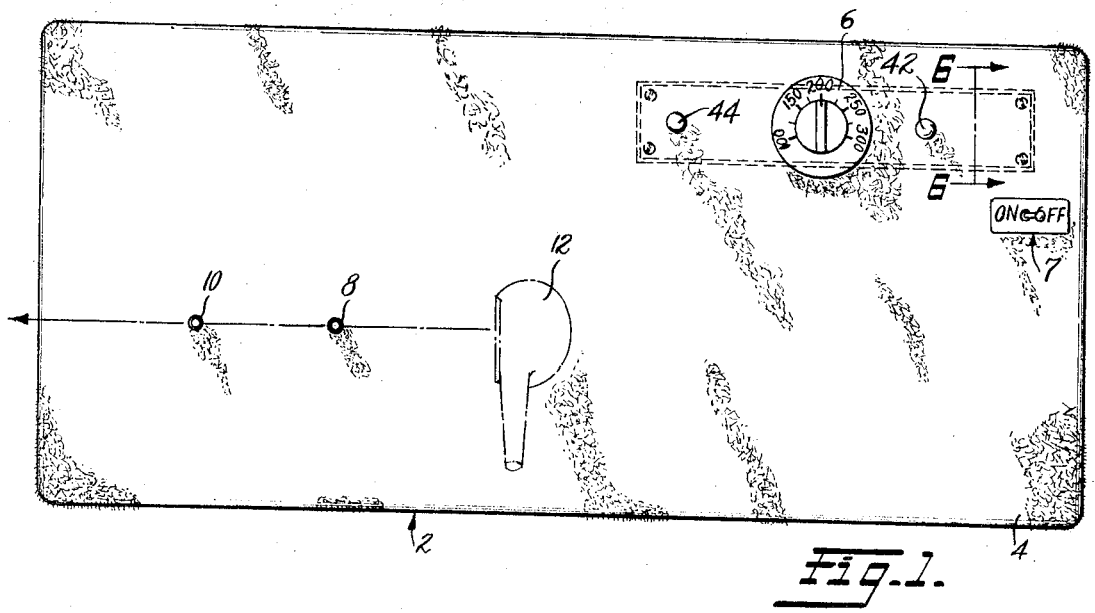
FIG. 1 is a top plan view of one form of the invention.
Figure 2:
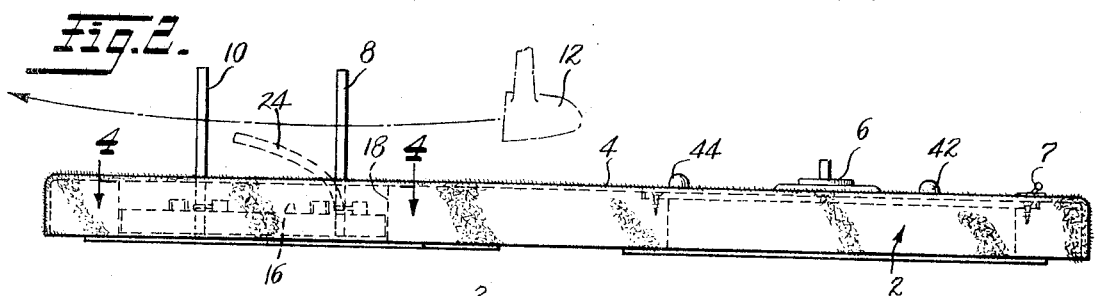
FIG. 2 is a side elevational view of FIG. 1.
Figure 3:
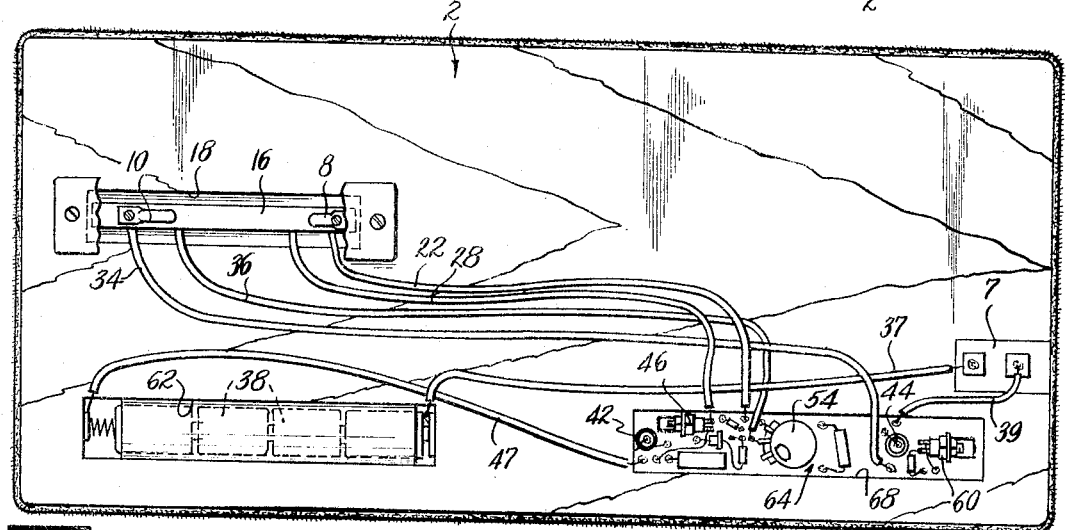
FIG. 3 is a bottom plan view of FIG. 1.
Figure 4:
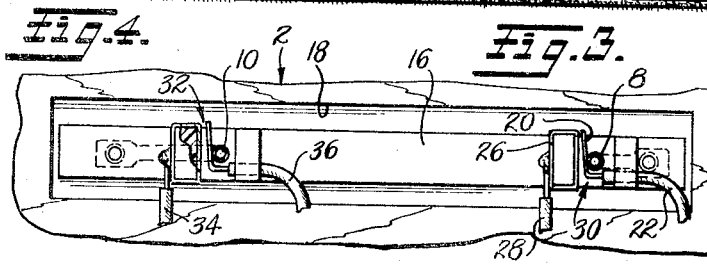
FIG. 4 is an enlarged sectional view taken along the line 4—4 of FIG. 2.

FIGS. 1 to 3 illustrate one form of the invention wherein a flat base member or board 2 is povided with a suitable surface 4 simulating a golf tee. A control knob 6 is accessible from the top of the base member for presetting a potentiometer, as will be described later. Adjacent the control knob 6 is a switch 7 comprising a master or on-off switch for the apparatus. Projecting upwardly from the surface 4 of the base member is a pair of upright pegs or actuator elements 8 and 10. The actuator elements are in the form of flexible members, for example, relatively stiff but flexible rubber tubing, and are shown spaced apart in the direction of travel of a golf club head 12 during a practice swing. Also viewable from the top of the base member is a pair of signal lights 42 and 44, which will be described in more detail later.

The upstanding actuator elements 8 and 10 are similar in construction and in function so only one will be described in detail. Taking for example the first actuator 8, it is secured in any suitable manner to a base block 16 mounted in a recess 18 in the baseboard 2 and extends upwardly through an enlarged opening in the surface 4. Closely adjacent the base of the actuator 8 (see FIG. 3) is a flexible end portion 20 of a conductor 22. When the club head 12 strikes the actuator 8, the latter is caused to flex or bend downwardly and forwardly as indicated by dotted lines 24 of FIG. 2. When this occurs, the base or bottom portion of the actuator is also flexed sufficiently to flex the wire end 20 into contact with a conductor 26 connected to a conducting lead wire 28. Thus, the structure described constitutes a first switch 30, as identified in FIG. 3. The second actuator 10 may be of identical construction to that just described and the switch actuated thereby will be designated switch 32 connected to conductors 34 and 36.

Refer now to the schematic circuit diagram of FIG. 7 wherein the master switch 7, switches 30 and 32, and conductors 22, 28, 34 and 36 are identified by the same numerals employed in FIGS. 1 to 4. The circuit includes a battery or voltage source 38 connected to one side of the switch 7 by conductor 37, the other side of which is connected to one end of a resistor 40 by conductor 39, and one side of each of two signal lamps 42 and 44. The conductor 22 from switch 30 is connected to the other side of the resistor 40 and the conductor 28 is connected to the control terminal of a silicon controlled rectifier 46. One side of the rectifier 46 is connected to the other side of the lamp 42 and the other side of the rectifier (SCR) 46 is connected to the other side of battery 38 by conductor 47. Between lamp 42 and SCR 46 a conductor connects to one side of a rectifying diode 8, which is in series with a resistor 50. The other side of the resistor 50 is connected to one side of a capacitor 52, the other side of which is connected to the battery 38 and to one side of the potentiometer 54, which is connected through a resistor 56 to the other side of the battery 38. The potentiometer 54 is the potentiometer previously referred to as being controlled by the knob 6 shown in FIG. 1. As shown, that side of potentiometer 54 opposite the side connected to resistor 56 is connected to the conductor 36 leading to switch 32. The conductor 34 from the other side of switch 32 is connected, through a resistor 58 to the control terminal of a second silicon controlled rectifier (SCR) 60. One side of the SCR 60 is connected to the lamp 44 and the other side thereof is connected to battery 38, all as clearly shown in the figure.

The SCR's 46 and 60 are well known devices which are biased to conductivity by the application of a voltage pulse to their respective control terminals. If that voltage pulse is of sufficient amplitude, as determined by the characteristics of the SCR, the device will freely conduct current therethrough. If the voltage pulse is of insufficient magnitude, the device will not start to conduct. The SCR's, therefore, function as switching devices in their respective circuits and the SCR 60 further functions as a comparing device, as will be referred to later. Assume that the switch 7 is open and it is desired to utilize the apparatus for practice. The switch 7 is first closed and then, as will be obvious, the battery will impress a charge on the capicitor 52. This will be done without lighting the lamp 42 since the resistance thereof is very small in comparison to the resistance of the resistor 50. The charge will remain on capacitor 52 until a practice swing is taken. The switches 30 and 32 are normally open and are only momentarily closed when their respective actuators 8 or 10 are flexed, in the manner previously described. When the golfer takes his practice swing, the club head first hits actuator 8 and momentarily closes switch 30. Closing of this switch applies a pulse of battery voltage to the control terminal of SCR 46 of sufficient magnitude to cause the same to conduct. When this occurs current flows from the battery through lamp 42 and SCR 46, then back to the battery. This current is sufficient to light the lamp 42. At the same time this removes the charging voltage from capacitor 52 since the battery is, in effect short-circuited relative to the capacitor. The diode 48 prevents discharge of the capacitor through lamp 42 at this time and its charge is retained thereon except that the charge can leak through potentiometer 54 and resistor 56 to discharge the capacitor. The network comprising capacitor 52, potentiometer 54 and resistor 56 is a well known RC network and the rate of discharge of the capacitor is determined by the value of the capacity of 52 and the resistance in 54 and 56. At any given instant, following closure of switch 30, the charge remaining on capacitor 52 is a measure of the time that has elapsed since the closing of switch 30.

As the club head 12 continues its forward travel and impacts actuator 10, that actuator functions exactly as did actuator 8 to momentarily close switch 32 but since some time interval has elapsed between the closing of switches 30 and 32, the charge remaining on capacitor 52, when switch 32 is closed, is less than its initial charge and is of a value that constitutes a measure of the elapsed time. As previously mentioned, the magnitude of a voltage pulse that will cause SCR 60 to conduct is predetermined by the characteristics of SCR 60 and that value can be considered a reference value representing an optimum time interval. Thus, when switch 32 is closed, the charge then remaining on capacitor 52 is applied to the control terminal of SCR 60. If that remaining charge is sufficient to trigger SCR 60 to conductivity, the same will conduct current from the battery 38 through lamp 44 and back to the battery, thus indicating that the time interval between impacts on the actuators 8 and 10 was no greater than the predetermined or desired time interval, and therefore, the club head was travelling at least the optimum desired speed. If the charge remaining on capacitor 52 at the time switch 32 is closed is not sufficient to trigger SCR 60, the lamp 44 will not light. Thus, after a practice swing, a golfer need only observe lamps 42 and 44, visible from the top of the apparatus. If only lamp 42 is on, he knows that he did not swing the club fast enough for the desired golf shot whereas if both lights 42 and 44 are on, he knows that his club head speed was at least equal to the optimum desired speed.

As is well known, the charge remaining on capacitor 52, after a given time interval, is at least in part dependent on the value of resistance in series therewith (resistors 54 and 56). Potentiometer 52 is selectively adjustable to vary the resistance thereof, by manipulation of knob 6 to predetermine the optimum speed desired. The potentiometer control knob 6 may be graduated in yardage, for example, or in any other suitable manner. As shown in FIG. 1, the knob 6 is graduated in terms of yardage. Thus a player can first determine how far he would like to hit a golf ball and can then set control knob 6 to that particular yardage. This will preset potentiometer 54 to such value that, if he swings his club fast enough to normally drive a golf ball the desired distance, both lamps 42 and 44 will come on, indicating a drive of at least the preset distance. He can then reset control knob 6 for the distance desired on his second shot, and so on.

After a practice swing in which either or both of the lamps 42 and 44 have been lighted, it will be apparent that current continues to flow through the lamp circuits and capacitor 52 will become discharged. To condition the apparatus for further operation, it is necessary to first open switch 7 and then reclose the same. Upon opening switch 7, current is denied to both SCR's and they cease conducting. Upon reclosing switch 7, neither SCR will start to conduct until a control pulse of the required amplitude is applied to their control terminals in the manner already described.

FIG. 3 illustrates a contemplated form of the apparatus wherein the base 2 is shown as a solid board or the like having the previously described recess 18 therein. An additional recess 62 serves as a housing for the battery 38, which is connected to the circuit board 64 and switch 7 by the illustrated conductors. FIG. 3 also illustrates the various conductors connecting the described switches to the battery 38 and the circuit board 64.

As shown in FIG. 6, the circuit board 64 comprises a sheet 66 of insulating material seated in the baseboard 2 over a recess 68 therein. The various circuit components are mounted on the bottom face of the circuit board, which is also provided with conductive surface portions 70 separated by channels or nonconducting spaces 72. Thus, the circuit board is in the nature of a printed circuit, as will be obvious to those skilled in the art. FIG. 5 illustrates one manner of arranging the conductive portions 70 and the circuit components thereon.

The form of the invention shown in FIGS. 1 to 6 contemplates a relatively small baseboard 2 adapted to be carried about and adjacent which the golfer stands when practicing. FIG. 8 schematically illustrates a modified form wherein the base or board 74 is large enough to accommodate the described mechanism and elements and to also provide a surface on which the golfer may stand while making his practice swing.

Obviously, the start and end of the timing operation could be accomplished by means other than impacts by a club head. For example, the first and second pulses could be produced by photo-electric or magnetic means as the club head swings therepast.

While a single specific embodiment of the invention has been shown and described herein, it is to be understood that the same is merely illustrative of the principles involved and that other embodiments may be resorted to.

What is claimed is:

1. A golf practice device comprising: first and second spaced movable actuators arranged to be successively engaged and moved by a swinging golf club head; a timing device having means for producing an electrical voltage proportional to time; first control means responsive to movement of said first actuator for starting operation of said timing device; comparing means; second control means responsive to movement of said second actuator for connecting said timing device to said comparing means, said comparing means comparing the voltage produced by said timing device, with a predetermined voltage representing a known time; and means controlled by said comparing means for indicating whether said elapsed time is greater than or less than said known time.

2. A golf practice device as defined in claim 1 wherein said timing device comprises a resistance-capacitance timing network; a source of voltage; a first circuit for applying said voltage to said network; and a second circuit, said first control means comprising switching means in said second circuit for removing said applied voltage from said network whereby the voltage remaining on said network at the time of said second actuation is a measure of said elapsed time.

3. A golf practice device as defined in claim 2 including a signal lamp in said second circuit to indicate removal of said applied voltage from said network.

4. A golf practice device as defined in claim 2 wherein said actuators are movable means adapted to be struck and moved by said club head and said switching means comprising a silicon controlled rectifier; and a switch arranged to be closed by movement of said first actuator upon impact of said club head with said first actuator for applying a triggering pulse of voltage from said source to said silicon controlled rectifier.

5. A golf practice device as defined in claim 2 wherein said comparing means comprises a silicon controlled rectifier; an indicator circuit, including said indicating means, connecting said source of voltage to said rectifier, said rectifier being adapted to be triggered to conduction by a voltage pulse of predetermined magnitude representing said predetermined time interval, said second control means comprising a switch for applying a pulse of the voltage remaining on said network to said rectifier.

6. A golf practice device as defined in claim 5 wherein said indicating means comprises a lamp.

7. A golf practice device as defined in claim 2 including a selectively operable control switch in said first circuit for connecting said source of voltage to said device.

8. A golf practice device as defined in claim 1 wherein each of said actuators comprises an upstanding resiliently bendable element adapted to be flexed downwardy upon impact by said golf club head and then return to upstanding position; said control means each comprising a normally open switch adjacent the base of each element in position to be engaged and closed by flexure thereof.

References Cited
UNITED STATES PATENTS

| | | | |
|---|---|---|---|
| 2,283,277 | 5/1942 | Modine | 324—70 |
| 2,571,974 | 10/1951 | Walker | 324—70 |
| 2,825,569 | 3/1958 | Aluarez | 273—186 |
| 3,127,595 | 3/1964 | Coyne | 324—68 |
| 3,373,612 | 3/1968 | Thompson | 324—70 |
| 3,416,079 | 12/1968 | Burger | 324—68 |

RUDOLPH V. ROLINEC, Primary Examiner

M. J. LYNCH, Assistant Examiner

U.S. Cl. X.R.

273—186